Aug. 25, 1953 F. W. SEYBOLD 2,649,910

DRIVE MECHANISM FOR GUILLOTINE KNIFE BARS

Original Filed Aug. 20, 1948 13 Sheets-Sheet 1

INVENTOR.
FREDERICK W. SEYBOLD

BY Ostrolenk & Faber
ATTORNEYS

Aug. 25, 1953 F. W. SEYBOLD 2,649,910

DRIVE MECHANISM FOR GUILLOTINE KNIFE BARS

Original Filed Aug. 20, 1948 13 Sheets-Sheet 2

INVENTOR.
FREDERICK W. SEYBOLD

BY Ostrolenk & Faber
ATTORNEYS

INVENTOR.
FREDERICK W. SEYBOLD

BY Ostrolenk & Faber
ATTORNEYS

Aug. 25, 1953 F. W. SEYBOLD 2,649,910

DRIVE MECHANISM FOR GUILLOTINE KNIFE BARS

Original Filed Aug. 20, 1948 13 Sheets-Sheet 4

INVENTOR.
FREDERICK W. SEYBOLD

BY Ostrolenk & Faber
ATTORNEYS

DRIVE MECHANISM FOR GUILLOTINE KNIFE BARS

Original Filed Aug. 20, 1948 13 Sheets-Sheet 5

INVENTOR.
FREDERICK W. SEYOLD

BY Ostrolenk & Faber
ATTORNEYS

Aug. 25, 1953 F. W. SEYBOLD 2,649,910

DRIVE MECHANISM FOR GUILLOTINE KNIFE BARS

Original Filed Aug. 20, 1948 13 Sheets-Sheet 6

INVENTOR.
FREDERICK W. SEYBOLD

BY Ostrolenk & Faber

ATTORNEYS

Aug. 25, 1953 F. W. SEYBOLD 2,649,910

DRIVE MECHANISM FOR GUILLOTINE KNIFE BARS

Original Filed Aug. 20, 1948 13 Sheets-Sheet 7

INVENTOR.
FREDERICK W. SEYBOLD

BY Ostrolenk & Faber
ATTORNEYS

DRIVE MECHANISM FOR GUILLOTINE KNIFE BARS

Original Filed Aug. 20, 1948 13 Sheets-Sheet 8

INVENTOR.
FREDERICK W. SEYOLD

BY Ostrolenk & Faber
ATTORNEYS

INVENTOR.
FREDERICK W. SEYBOLD

BY Ostrolenk & Faber
ATTORNEYS

Aug. 25, 1953 F. W. SEYBOLD 2,649,910

DRIVE MECHANISM FOR GUILLOTINE KNIFE BARS

Original Filed Aug. 20, 1948 13 Sheets-Sheet 10

INVENTOR.
FREDERICK W. SEYBOLD

BY Ostrolenk & Faber
ATTORNEYS

INVENTOR.
FREDERICK W. SEYBOLD

BY Ostrolenk & Faber
ATTORNEYS

| | I | II | III | IV | V | VI |
|---|---|---|---|---|---|---|
| VALVES | CLAMP GOING DOWN FOOT TREADLE ONLY NO POWER | CLAMP GOING UP FOOT TREADLE RELEASE OR POWER | CLAMP GOING DOWN POWER NO FOOT TREADLE OR AFTER FOOT TREADLE | CLAMP GOING DOWN POWER WITH FOOT TREADLE HELD DOWN | MACHINE AT REST CLAMP UP | CLAMP GOING DOWN FOOT TREADLE— NO POWER—BUT ADDED HYDRAULIC POWER |
| A-1 | CLOSED UP PREVENTS FLOW BETWEEN RESERVOIR 81 & 87 AT BOTTOM OF CYLINDER 52 THRU A1 | OPEN DOWN CONNECTS RESERVOIR 81 WITH 87 AT BOTTOM OF CYLINDER 52 THRU A1 | CLOSED UP | CLOSED UP | OPEN DOWN | CLOSED UP |
| A-2 | OPEN UP CONNECTS RESERVOIR 81 WITH 86 AT TOP OF CYLINDER 52 THRU A2 | CLOSED DOWN PREVENTS FLOW BETWEEN RESERVOIR 81 & 86 AT TOP OF CYLINDER 52 THRU A2 | OPEN UP | OPEN UP | CLOSED DOWN | OPEN UP |
| B | CLOSED UP PREVENTS FLOW BETWEEN ACCUMULATOR 82 & 86 AT TOP OF CYLINDER 52 THRU B | OPEN DOWN CONNECTS ACCUMULATOR & 86 AT TOP OF CYLINDER 52 THRU B | CLOSED UP | CLOSED UP | OPEN DOWN | CLOSED UP |
| C | OPEN DOWN CONNECTS RESERVOIR 81 & 87 AT BOTTOM OF CYLINDER 52 THRU C | CLOSED UP PREVENTS FLOW BETWEEN RESERVOIR 81 & 87 AT BOTTOM OF CYLINDER 52 THRU C | OPEN DOWN | OPEN DOWN | CLOSED UP | OPEN DOWN |
| CHECK VALVE D | PREVENTS FLOW DOWNWARD FROM ACCUMULATOR 82 TO 87 AT BOTTOM OF CYLINDER 52 | SAME AS I | PERMITS FLOW UPWARD FROM 87 AT BOTTOM OF CYLINDER TO ACCUMULATOR 82 | SAME AS III | SAME AS I | EXCEPT FOR OPERATION OF NEEDLE VALVE G, PRESSURE ON OPPOSITE SIDES IS PRACTICALLY EQUAL IT DOES NOT MATTER IF D OPENS OR CLOSES |
| THREE-WAY VALVE E | POSITION I OF FIG. 3 | POSITION I OF FIG. 3 | POSITION I OF FIG. 3 | POSITION I OF FIG. 3 | POSITION I OF FIG. 3 | POSITION II OF FIG. 3 |
| CHECK VALVE F | OPENS TO PERMIT FLOW FROM RESERVOIR DOWN TO 87 AT BOTTOM OF CYLINDER 52 THRU C | NO FUNCTION SINCE C IS CLOSED | PREVENTS FLOW FROM 87 TO RESERVOIR OR ACCUMULATOR THROUGH C | PREVENTS BACK FLOW FROM 87 AT BOTTOM OF CYLINDER UP TO RESERVOIR 81 THRU OPEN C | NO FUNCTION SINCE C IS CLOSED | SAME AS III |
| NEEDLE VALVE G | NO FUNCTION SINCE D IS CLOSED | SAME AS I | CREATES PRESSURE DIFFERENTIAL BETWEEN K & J; PRESSURE IN LOWER CYLINDER HIGHER THAN ACCUMULATOR | SAME AS III | SAME AS I | NO FUNCTION SINCE PRESSURE ON OPPOSITE SIDES IS PRACTICALLY EQUAL WHETHER OR NOT D OPERATES TO OPEN OR CLOSE |
| PISTON | STATIONARY | STATIONARY | MOVES DOWN | MOVES DOWN | STATIONARY | STATIONARY |
| CYLINDER | MOVES DOWN | MOVES UP | MOVES DOWN | MOVES DOWN | STATIONARY | MOVES DOWN |
| OIL BELOW PISTON | RESERVOIR PRESSURE | RESERVOIR PRESSURE | CLAMPING PRESSURE | SAME AS III | RESERVOIR PRESSURE | ACCUMULATOR PRESSURE |
| OIL ABOVE PISTON | RESERVOIR PRESSURE | ACCUMULATOR PRESSURE | RESERVOIR PRESSURE | RESERVOIR PRESSURE | ACCUMULATOR PRESSURE | RESERVOIR PRESSURE |

SINGLE BODY (A-1, A-2)

WORK TOGETHER (A-1, A-2, B, C)

FIG. 13

INVENTOR.
FREDERICK W. SEYBOLD

BY Ostrolenk & Faber
ATTORNEYS

INVENTOR.
FREDERICK W. SEYBOLD

BY Ostrolenk & Faber
ATTORNEYS

Patented Aug. 25, 1953 2,649,910

UNITED STATES PATENT OFFICE 2,649,910

DRIVE MECHANISM FOR GUILLOTINE KNIFE BARS

Frederick W. Seybold, Westfield, N. J., assignor to E. P. Lawson Co., Inc., New York, N. Y., a corporation of New York Original application August 20, 1948, Serial No. 45,285. Divided and this application April 5, 1950, Serial No. 154,045

5 Claims. (Cl. 164—54)

My present invention is a division of my application Serial No. 45,285, filed August 20, 1948, and relates to guillotine type paper cutters and more particularly to hydraulically operated clamping means therefor.

Essentially my invention contemplates connecting the knife driving means to the clamp through a telescoping fluid-filled cylinder and controlling the fluid in the cylinder so that hydraulically multiplied clamping force is obtained during the cutting stroke while nevertheless the clamp may be moved down by gravity and without hydraulic pressure during necessary operations preceding the cutting stroke.

The primary object of my invention is the provision of a novel guillotine-type knife and associated hydraulically operated clamping mechanism.

Another object of my invention is the provision of hydraulic clamp operating means whereby a telescoping connection between the knife drive mechanism and the clamp is controlled by admission of hydraulic fluid under pressure to one side or the other of the tube.

Another object is the provision of a hydraulic connection between the knife driving member and the driven member of the clamp comprising a closed tube on one of the members with suitable posts at each end and a piston slidable in the tube and connected to the other member wherein admission of fluid under pressure on one side or the other of the piston controls the operation of the clamp.

The foregoing and many other objects of my invention will become apparent in the following description and drawings in which:

Figure 9 is a schematic view of the clamp driving elements of Figure 8.

Figure 13 is a chart showing the various operations of my novel hydraulic system.

Figure 6:
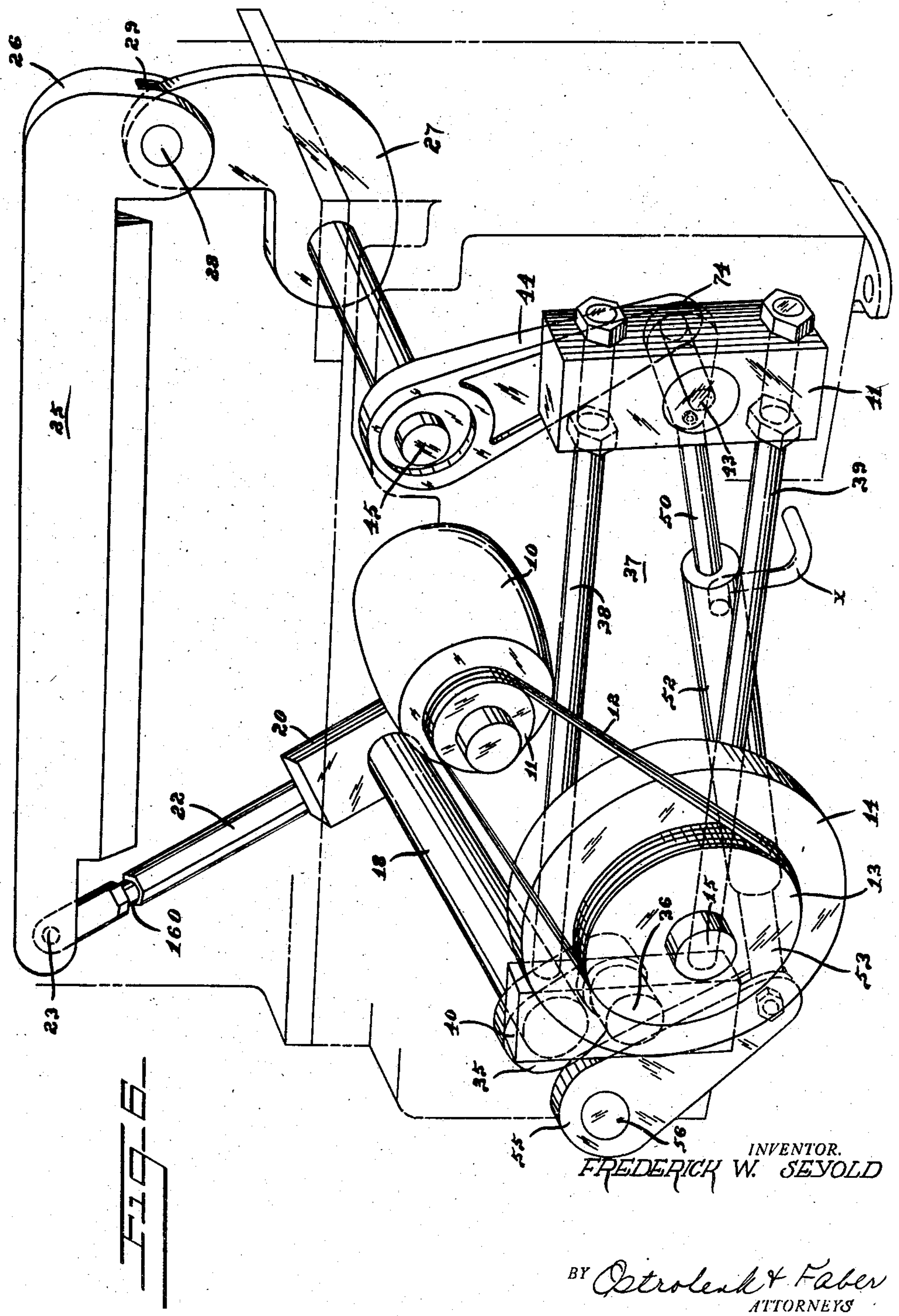
Figure 6 is a rear view of my knife mechanism with a portion of the housing removed showing the driving means for the knife blade and the interconnection of this driving means with the drive for the clamp but omitting portions of the clamp driving mechanism.
Figure 12:
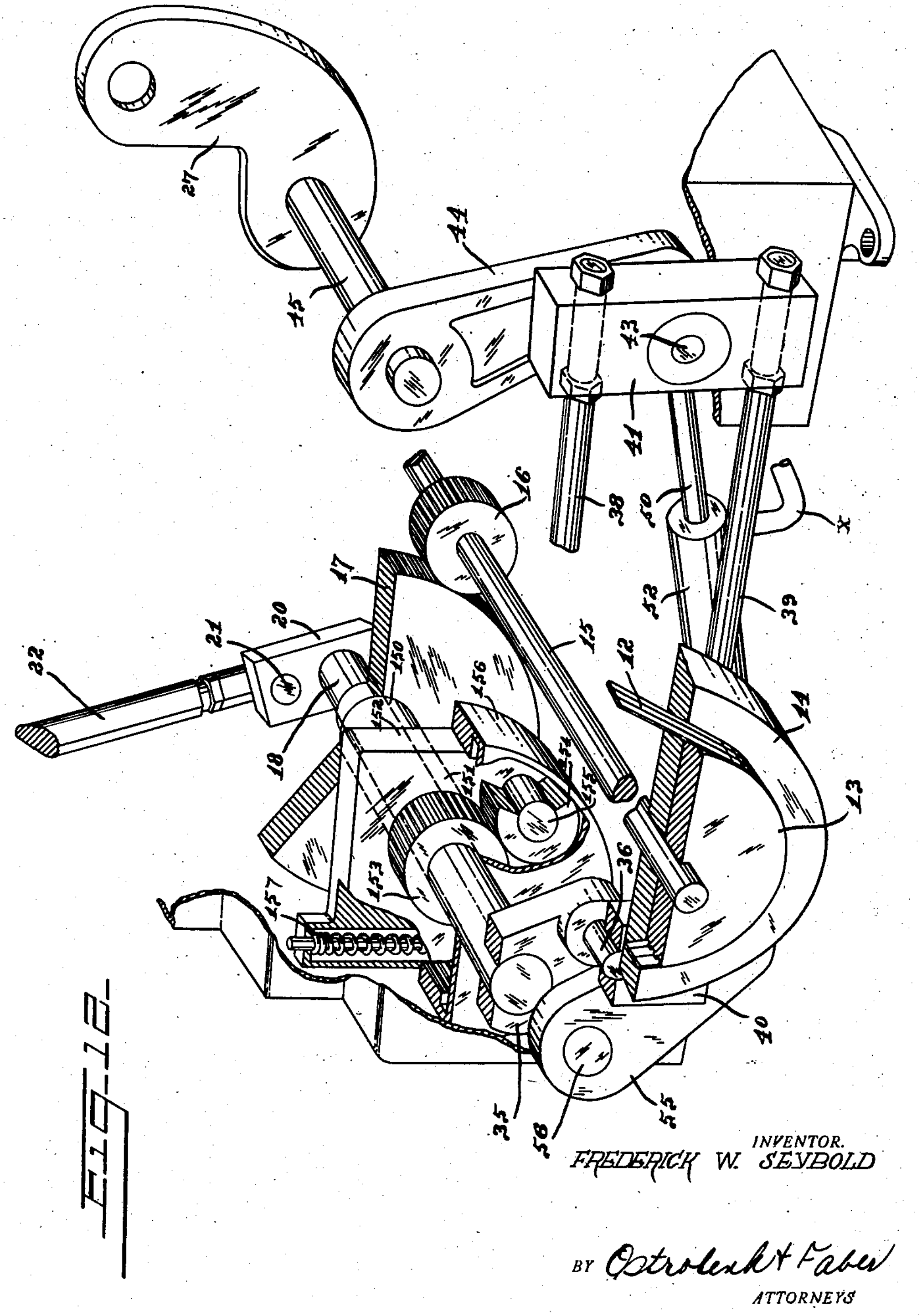
Figure 12 is a detailed view in perspective of the drive for the knife of my novel cutting machine.

Referring first to Figure 6 which is a rear view showing primarily the knife driving elements of my novel device, the motor 10 through its pulley 11 and belts 12, drives the pulley 13 which is integral with the fly wheel 14. Fly wheel 14 rotates freely on the main drive shaft 15 (see also Figure 12) of the machine. The drive shaft 15 is provided with clutch and brake elements as well as with overload protective elements of the type shown in my application Serial No. 673,289, filed May 23, 1946 and now Patent No. 2,570,873.

The specific clutch and brake elements used, as well as the specific overload protective elements used, form no part of the present invention and, therefore, require no specific description here. The clutch and brake elements serve, however, to connect flywheel 14 to shaft 15 at the beginning of a cycle and to disconnect flywheel 14 from shaft 15 at the end of a cycle.

It should be understood, however, that the machine is so constructed that it will cycle once in response to a control set by the operator and will halt until a recycling operation is desired so that the knife and clamp will descend once and rise again for each cycle of operation.

Gear 16 on shaft 15 meshes with gear 17 (Figure 12) on sleeve 150, rotatably mounted on shaft 18, carried in bearing 151 on plate 152. Sleeve 150 carries gear 153 which meshes with planetary gear 154 mounted on stud 155 on plate 152. Planetary gear 154 meshes with internal gear 156 carried by knife drive shaft 18. When shaft 15 is rotated, its gear 16 drives gear 17 on sleeve 150, driving gear 153 on sleeve 150 and through gear 154 drives gear 156 on shaft 18 to drive the knife and clamp in the manner hereinafter described. Where resistance is encountered by the knife, gear 154 on its stud 155 causes the plate 152 to rotate around sleeve 150 against the compression of spring 157. This operation is also described in my application Serial No. 673,289.

Figure 10:
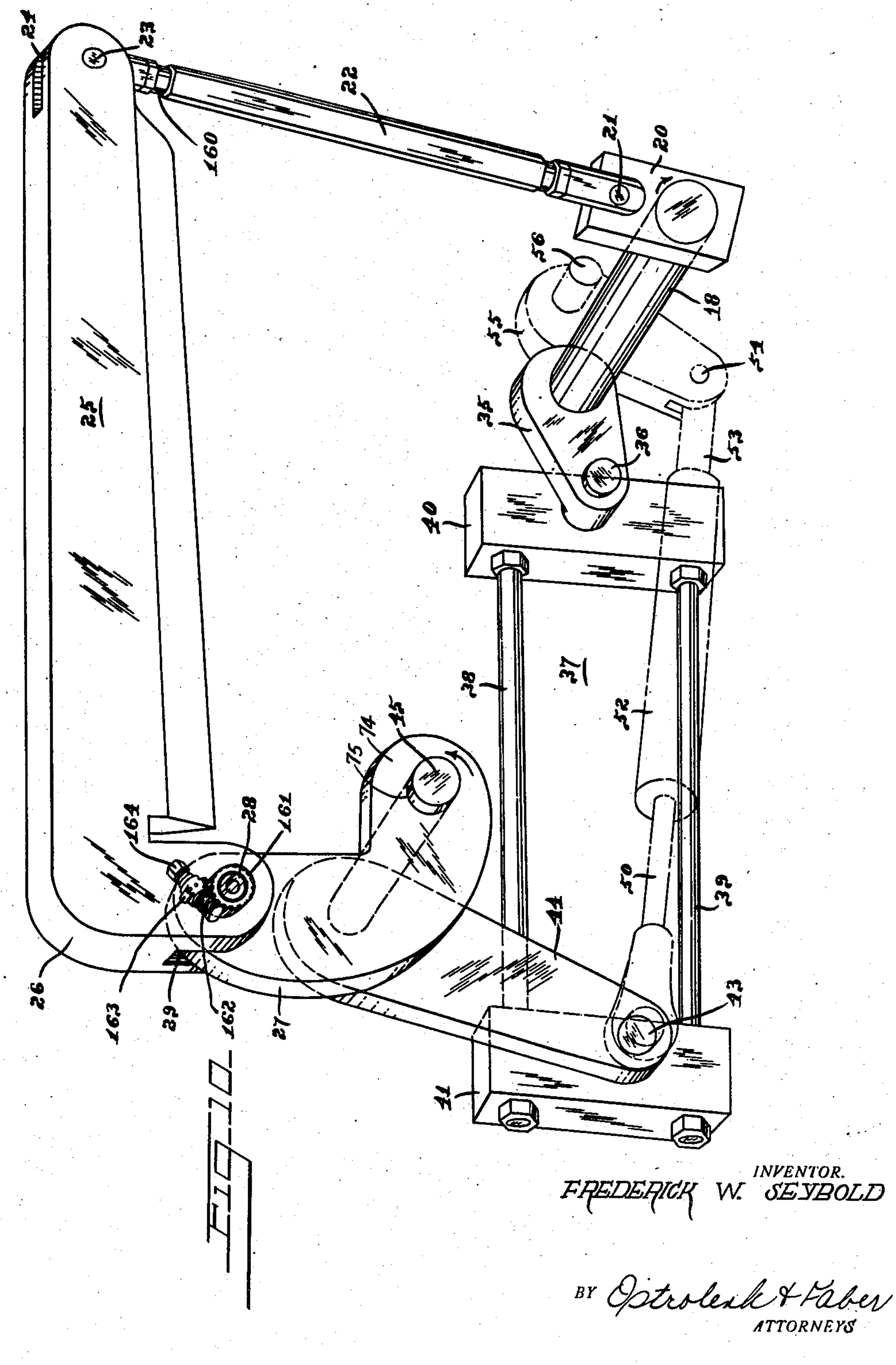
Figure 10 is a front view of the knife driving elements lifted out of the combined view of Figure 7.

The knife drive shaft 18 carries at the forward end thereof the crank 20 which is pivotally connected at the crank pin 21 to the knife draw bar 22, the length of which may be made adjustable in any suitable manner, as by the threaded connection at 160 (Figure 10). The upper end of the knife draw bar 22 is pivotally connected by the pin 23 in the clevis 24 at the right end of the knife bar 25 with respect to Figures 7 and 10. Thus, a single rotational cycle of the knife drive shaft 18 will rotate the crank 20 to pull the draw bar 22 down, therefore pulling down the right-hand end of the knife bar 25, and then will raise the bar 22 to force the right-hand end of the knife bar up.

Figure 7:
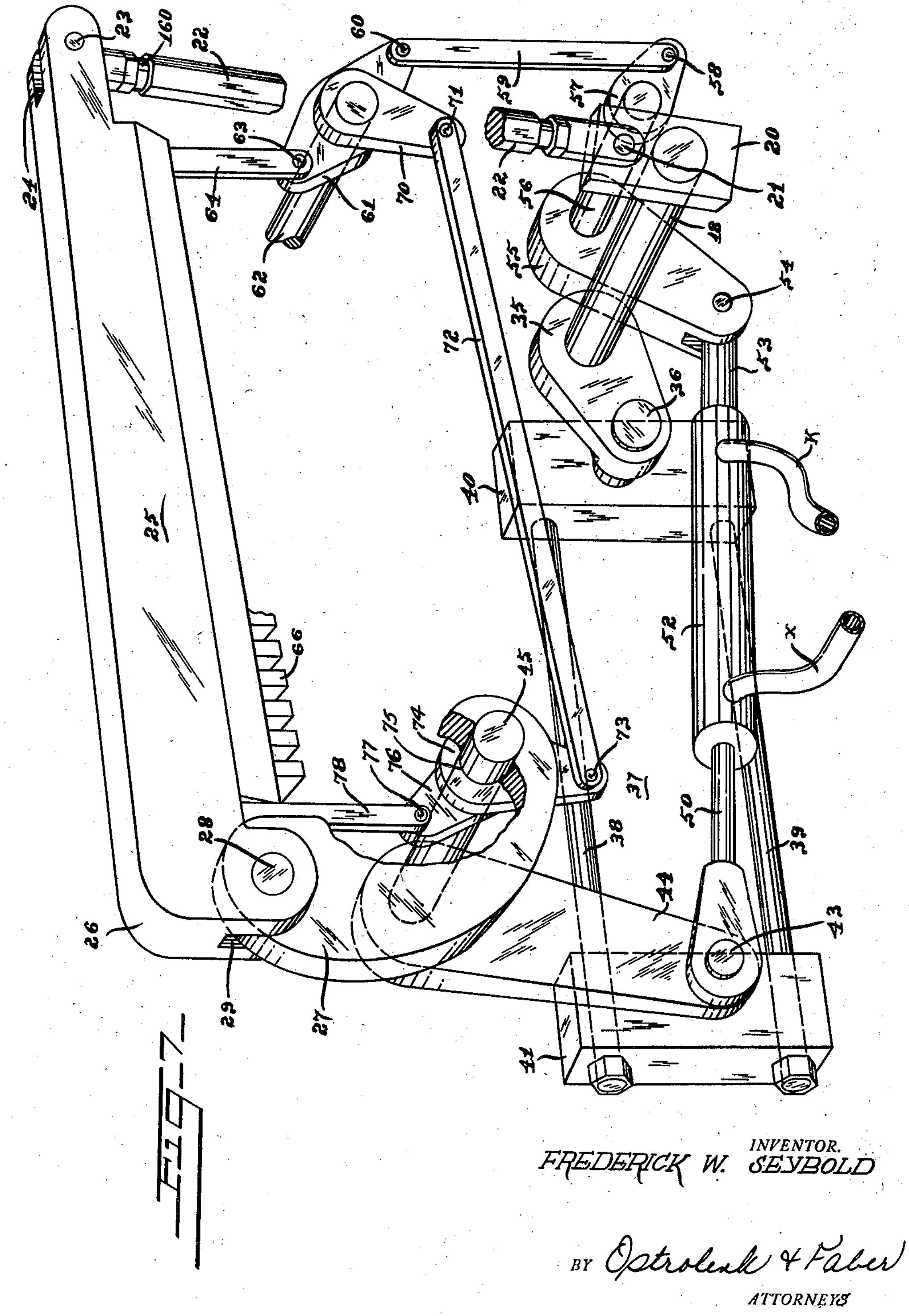
Figure 7 is a front view of my novel machine showing the combined drive mechanism for the clamp and knife blade.
Figure 11:
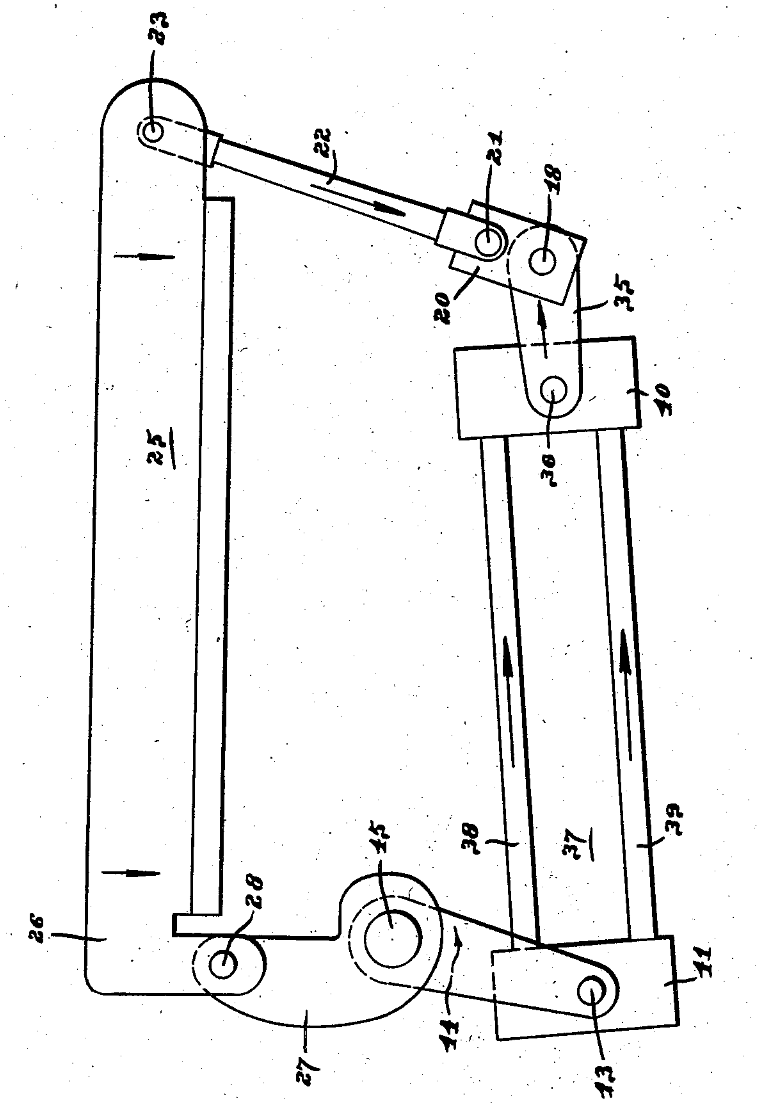
Figure 11 is a schematic view of the elements of Figure 10.

The opposite end 26 of the knife bar is simultaneously pulled down by the heavy arm 27, the upper end of which is pivotally connected by the eccentric pin 28 in the clevis 29 at the left-hand end of the knife bar with respect to Figures 7, 10, and 11. Pin 28 (Figure 10) is eccentric and adjustable in knife bar 25 to permit adjustment of arm 27 to correspond to the adjustment at 160 at the right side. Gear 161 on pin 28 meshes with worm 162, carried in bracket 163 and having the hexagonal end 164 which may be rotated by a wrench to cause gear 161 and pin 28 to rotate to vary the adjustment.

Arm 27 rotates counterclockwise with respect to Figures 7, 10 and 11 simultaneously with the downward motion of the draw bar 22. The arm 27 is then rotated clockwise to raise the left-hand end 26 of the knife bar 25 simultaneously with the upward or return stroke of the draw bar 22.

This unison of motion is achieved by placing an additional crank 35 at the rear end of the knife drive shaft 18 which is keyed to the shaft 18. The outer end of crank 35 is pivotally connected by crank pin 36 to the connecting rod 37 which comprises the parallel bars 38 and 39 connected and braced by the bracing bars 40 and 41 at opposite ends. Pin 36 carries the bracing bar 40. Bracing bar 41 at the left side is carried by the pin 43 which is pivotally connected to the end of the lever 44. Lever 44 is keyed to the shaft 45 to which in turn the arm 27 is keyed. Therefore, rotation of the knife driving shaft 18 in addition to rotating crank 20 to pull down the draw bar 22 also rotates crank 35 to pull the composite connecting rod 37 to the right with respect to Figures 10 and 11.

This results in pulling the lower end of lever 44 to the right and results in counterclockwise rotation of shaft 45 and corresponding counterclockwise rotation of the arm 27 with respect to Figures 10 and 11. Therefore, simultaneously with the downward motion of draw bar 22, the pin 28 and the left-hand end 26 of the knife bar 25 are drawn downwardly. The counterclockwise rotation of the arm 27 causes the knife bar 25 to swing laterally to the left as it is being pulled down, thereby producing the proper transverse motion of the knife bar 25 for efficient cutting while the knife drive shaft 18 moves through the first half cycle. Further rotation thereof causes the bar 22 to be pushed up, pushing up the right-hand end of the knife bar 25.

At the same time, the passage of crank 35 through the second half of the cycle causes it on continuation of its movement to push the composite connecting rod 37 to the left, thereby reversing the operation of shaft 45 and causing it and the arm 27 to rotate in a clockwise direction to lift up the left-hand end 26 of the knife bar 25 simultaneously with the rise of the right-hand end of the knife bar 25. The knife bar is thus pushed up simultaneously at both ends and swung at the same time laterally to the right during this rising motion in order to be ready for the next operation.

Figure 8:
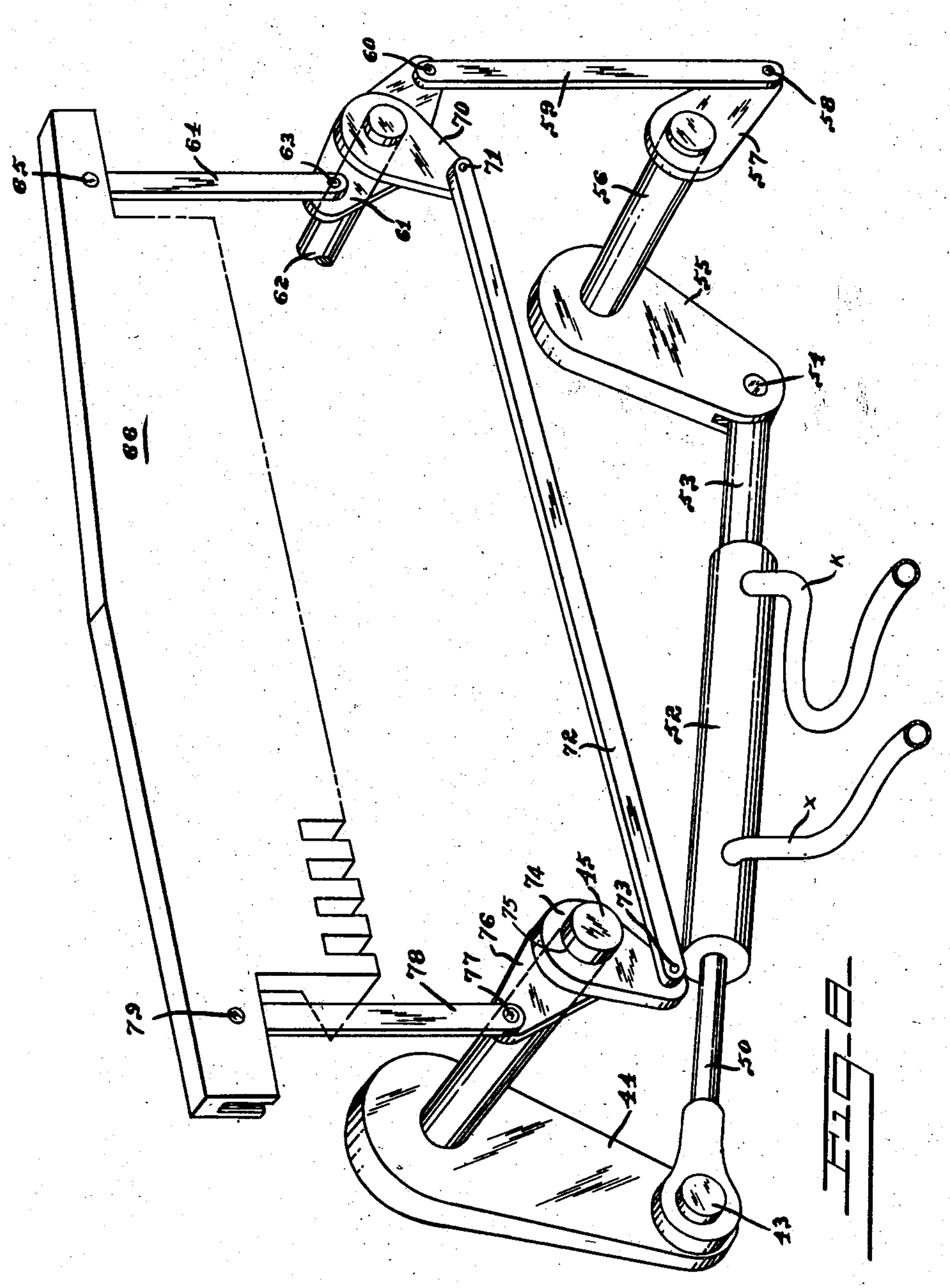
Figure 8 is a schematic fragmentary view taken from the front of my novel mechanism showing the clamp operating elements lifted out of the structure of Figure 7.
Figure 8:
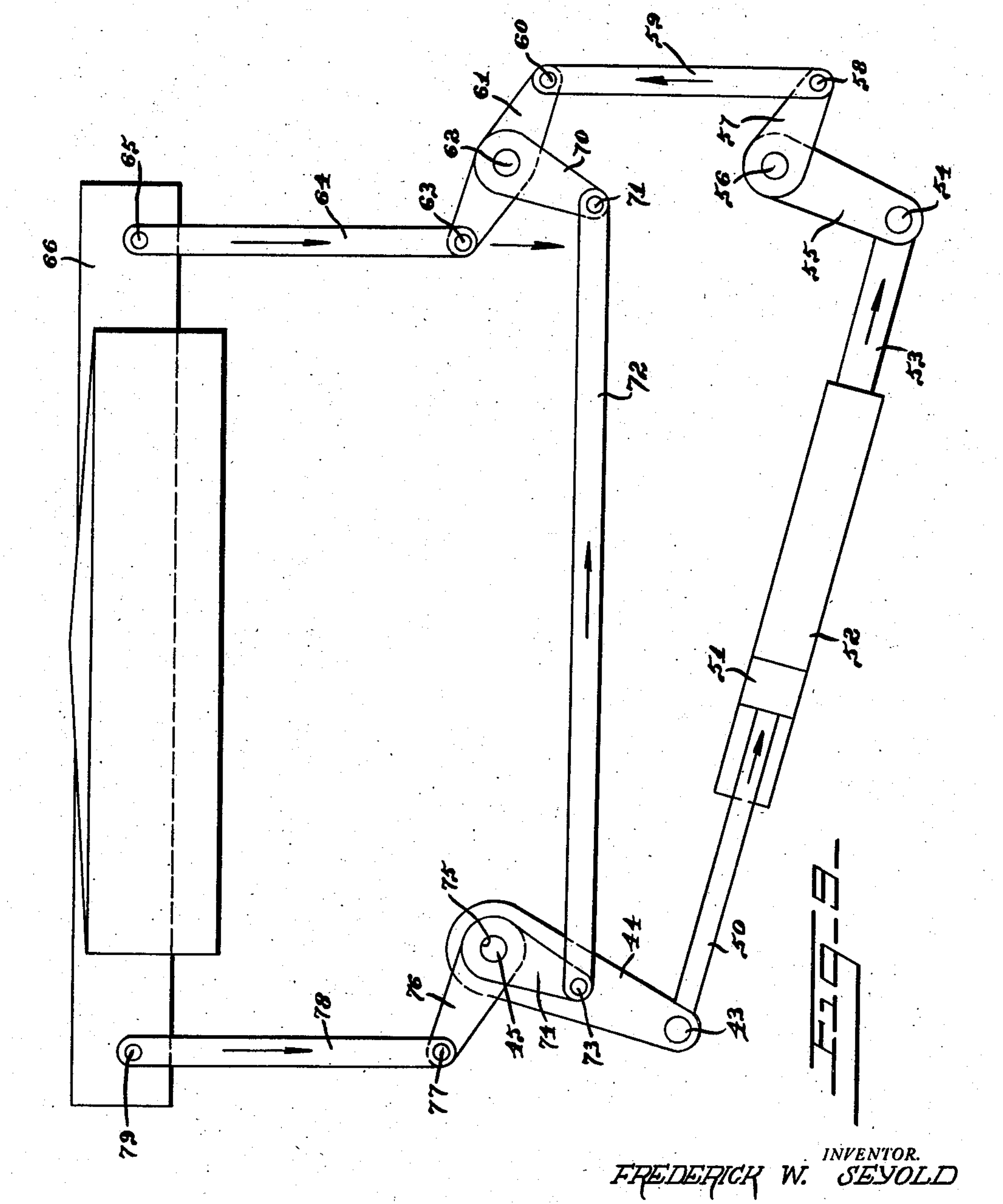

The clamp operation is shown in Figures 7, 8 and 9. Arm 44 and the end member 41 of the composite connecting rod 37 are pivotally connected by pin 43 also to the piston rod 50 of the piston 51 which in turn is slidable in the cylinder 52. The end of cylinder 52 has an extension 53 which is pivotally connected at 54 to the arm 55 keyed to the shaft 56. Shaft 56 carries the lever 57 keyed thereto. Lever 57 is pivotally connected by pin 58 to the connecting link 59. Link 59 is pivotally connected by pin 60 to the bell crank lever 61 which is free to rotate on the shaft 62 secured in the frame of the machine.

The opposite end of lever 61 is connected by pin 63 to the pull down link 64 which is pivotally connected at 65 to the right-hand end of clamp 66 (with respect to Figures 7, 8 and 9). The connection at 65 to the clamp 66 and the connection at the opposite end of the clamp hereinafter described may take any form which may be desired such as the adjustable connection described in my aforementioned application Serial No. 673,289.

The clamp as well as the knife bar may also have the specific construction described in the aforementioned application and may slide in channels and guides of the specific shape and formation therein described. Such specific guide means and such specific connections require no further description here since they form no part of the present invention.

Bell crank lever 61 has a depending arm 70 and its lower end is connected by pin 71 to the connecting link 72 which in turn is connected by pin 73 to the bell crank 74. Bell crank 74 is provided with the bore 75 which is a loose rotatable fit around the shaft 45.

The upper end 76 of bell crank 74 is connected by pin 77 to the pull down bar 78 which in turn is pivotally connected at 79 to the left-hand end of clamp 66.

When now the knife bar 25 is drawn down so that the connecting rod 37 and the lower end of arm 44 are moved to the right with respect to Figures 7, 8 and 9, pin 43 is forced to the right, pushing the piston rod 50 to the right with respect to these figures.

Assuming for the time being that piston rod 50, piston 51, cylinder 52 and cylinder extension 53 are a single solid unit, the movement of piston rod 50 to the right and downward with respect to Figure 9 results in corresponding counterclockwise rotation of arm 55 and in corresponding rotation of shaft 56 and lever 57. This causes the link 59 to rise, thereby rotating the lever 61 counterclockwise to lift the pin 60 thereof and to lower the pin 63 thereof. This pulls down the pull bar 64, pulling down the right-hand end of the clamp 66.

The counterclockwise rotation of bell crank lever 61 causes the arm 70 to rotate similarly moving the pin 71 and the connecting link 72 to the right and causing the bell crank lever 74—76 to rotate counterclockwise, thereby pulling down pin 77, pull bar 78, and, therefore, pulling down the left-hand end of the clamp 66 together with the right-hand end.

On a reversal of movement of arm 44 so that the lower end thereof moves to the left in the manner previously described in connection with the operation of the knife bar and again treating the hydraulic elements 50—51—52—53 as a single solid connection, the operation of arm 55 and lever 57, link 59, lever 61 and pull bar 64 is reversed to raise the right-hand end of clamp 66; the arm 70 has its lower end rotated to the left pushing the connecting link 72 to the left, rotating the bell crank lever 74—76 clockwise and pushing up the pull bar 78 and the left-hand side of the clamp.

Thus, during a single cycle of operation of the knife a lowering of the knife is accompanied by a lowering of the clamp and a raising of the knife is accompanied by a raising of the clamp. The elements are arranged and timed so that the clamp engages the paper surface before the knife enters the paper and leaves the paper surface after the knife has risen above it.

The elements must also be so arranged that the clamp may be caused to descend independently of the knife. That is the principal season why the bell crank lever 74—76 is a rotatable fit around the shaft 45 and is not keyed thereto.

Bell crank lever 74—76 may as readily be rotatable on another pivot but for convenience in constructing the mechanism it has been mounted for rotation around shaft 45.

The connection 43—50—51—52—53—54 from the knife operating mechanism to the clamp in order to operate the clamp in synchronism with the operation of the knife is a hydraulic connection as above noted in order to obtain properly controlled clamping pressure and to permit independent operation of the clamp.

Figure 1:
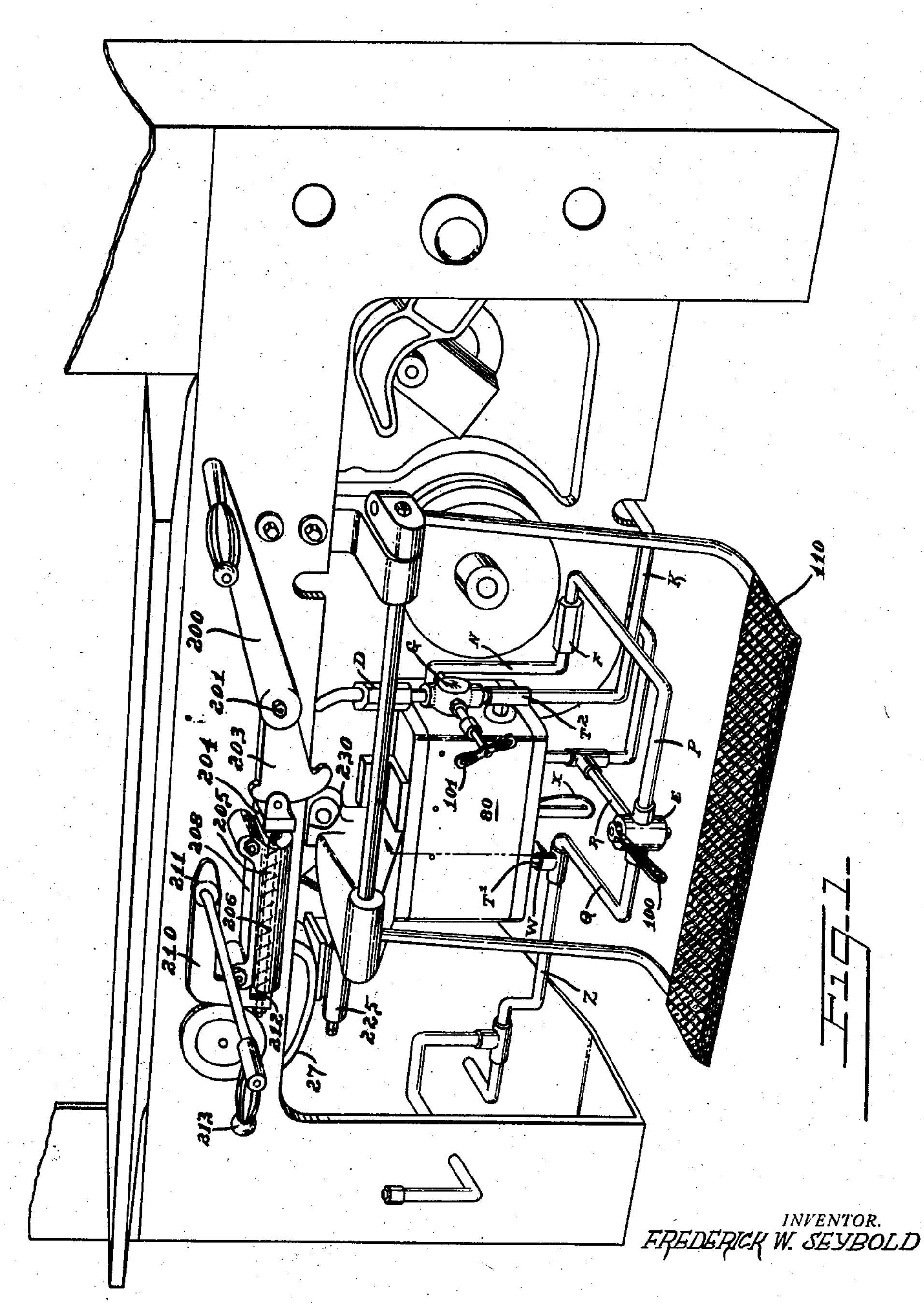
Figure 1 is a front view of my novel paper cutter.
Figure 2:
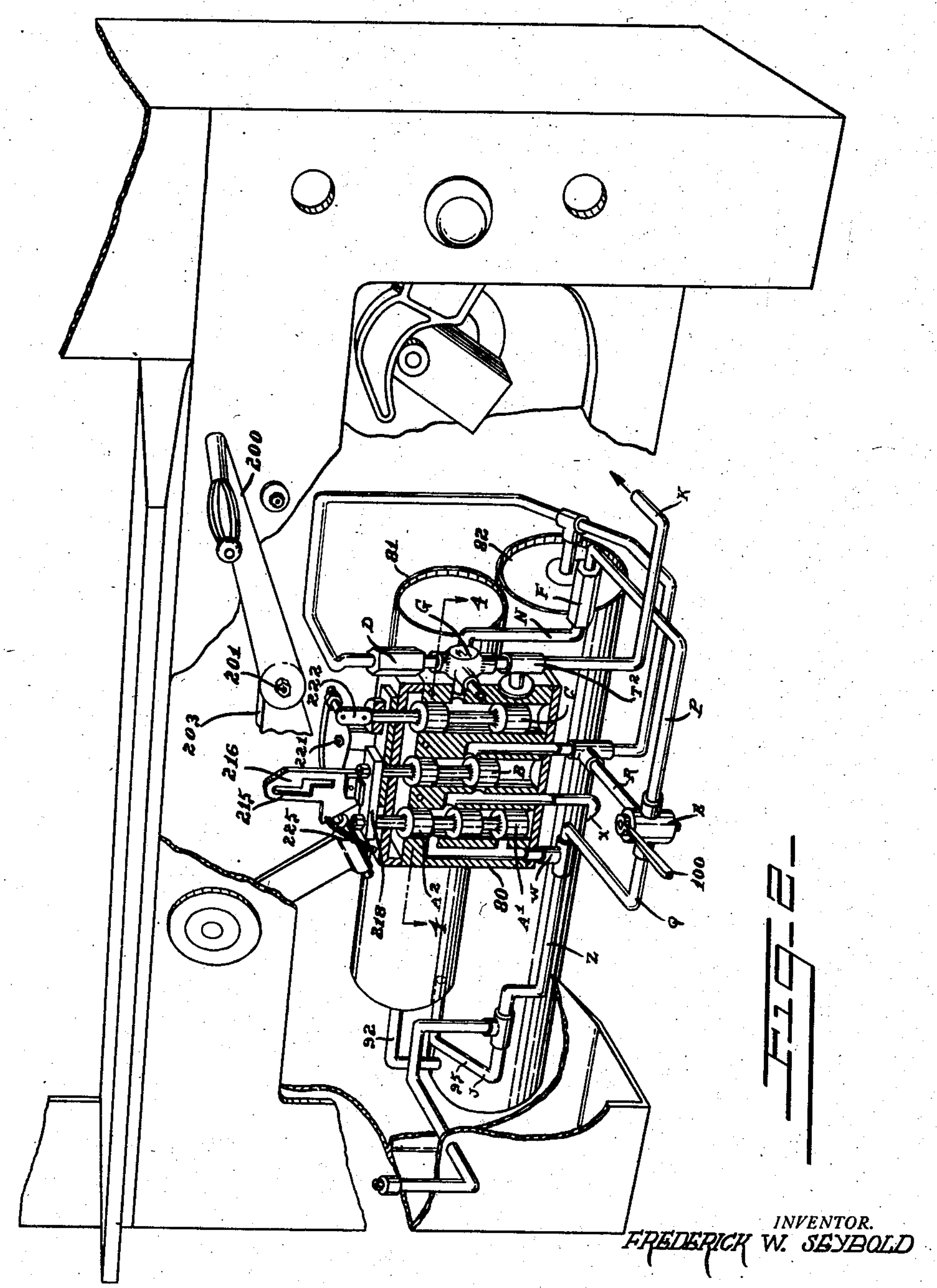
Figure 2 is a view corresponding to that of Figure 1, with a part of the front broken away in order to show a portion of the hydraulic system.
Figure 4:
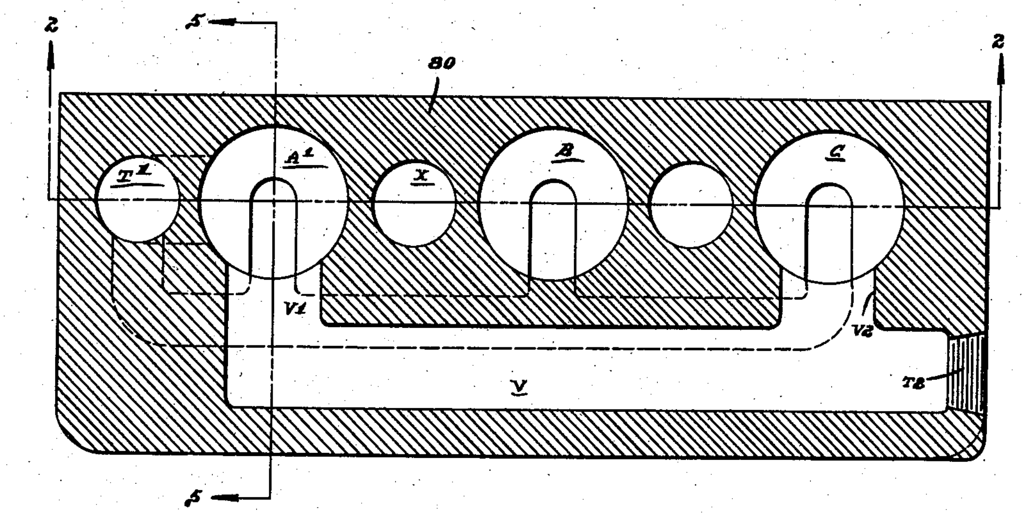
Figure 4 is a cross-sectional view taken from line 4—4 of Figure 2 looking in the direction of the arrows. The vertical section through the hydraulic system in Figure 2 is taken from line 2—2 of Figure 4 looking in the direction of the arrows.
Figure 5:
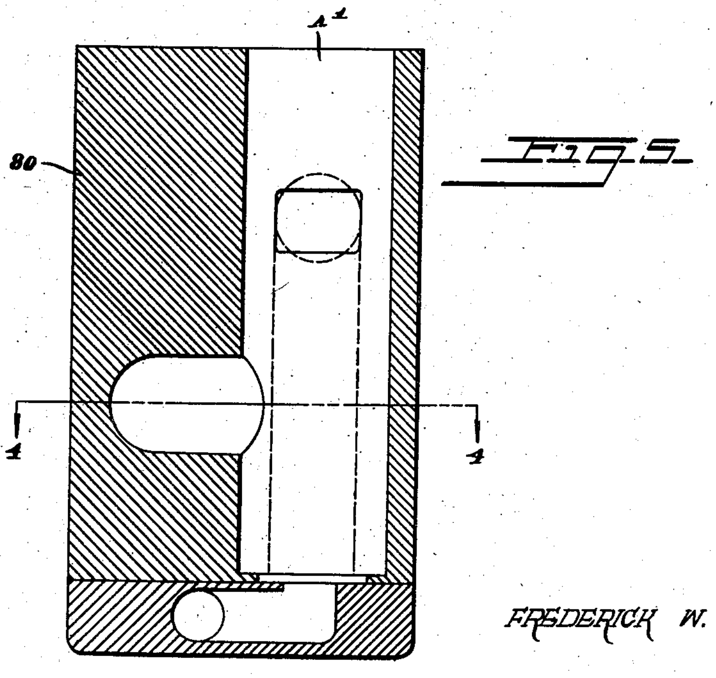
Figure 5 is a cross-sectional view taken from line 5—5 of Figure 4 looking in the direction of the arrows. The cross-section line 4—4 in Figure 5 indicates the line in which the horizontal section of Figure 4 is taken.

The present structure which includes piston 51 and cylinder 52 in the mechanical path from the knife operating apparatus to the clamp operating means provides a simplified hydraulic method for controlling the clamping pressure. This is accomplished by the valve controls of the hydraulic system shown in Figures 2, 4 and 5, the hydraulic connections shown in Figures 1 and 2, and the hydraulic system generally illustrated schematically in Figure 3, all of which must be taken together with the chart of Figure 13.

Referring first to the schematic view of Figure 3, it will again be seen that arm 44 keyed to shaft 45 is connected by pin 43 to piston rod 50 of the piston 51, which in turn is slidable in the hydraulic cylinder 52. The opposite end of the cylinder 52 has a connection 53, the right-hand end of which is pivotally connected by the pin 54 to the arm 55 keyed to the shaft 56 which operates the clamping mechanism as previously described.

The operation of the hydraulic system is controlled by valves A1, A2, B and C and their associated conduits and valve seats, all of which are contained in the housing 80 located at the front of the machine. The hydraulic system also includes a reservoir 81 and an accumulator 82. The accumulator is provided with a piston 83 biased toward the right by the compression spring 84 captured between the left-hand wall 85 of the accumulator and the piston 83. The upper or left-hand end of the piston 51 is provided with the flexible hose X connected to the opening 86 at the upper or left-hand end of cylinder 52.

The lower or right-hand end of cylinder 52 is provided with the flexible hose K connected in any suitable manner to the opening 87 at the lower or right-hand end of cylinder 52.

Flexible hose X is connected to passage L within the valve housing 80 which in turn is connected to valve seat L1 of valve B and valve seat L2 of valve A2. Flexible hose K is connected to a T coupling T2. One outlet of the coupling T2 is connected to passage V in the valve housing 80; the other outlet is connected to conduit U. Conduit U is connected by the T coupling T3 to conduit U1 which leads into the right-hand end 90 of the accumulator 85 and to conduit S which in turn is connected to the T coupling T4.

A needle valve G and a check valve D are provided in conduit or pipe U between the T couplings T2 and T3, the check valve being located closer to the coupling T3 and the needle valve G being located between the check valve D and the coupling T2. Passage R1 in the valve housing 80 is connected between valve B and the T coupling T4. The remaining opening of the T coupling T4 is connected by pipe R to the three-way valve E so that when valve B is open, the upper opening 86 of cylinder 52 may be connected through elements X, L and L1 through valve B and elements R1 and T4 to the accumulator 82 and also through element T4 and pipe R to the three-way valve E.

Passage V in valve housing 80 is connected by passage V1 to one side of valve A1 and when valve A1 is opened, the lower opening 87 is connected thereby to passage W1 to the pipe W which in turn is connected by the T coupling T1 to the pipes Z and Q. Thus, when valve A1 is open, the lower opening 87 of cylinder 52 may be connected by the elements T2, V, V1 and valve A1 to elements W1, W and T1 to both elements Z and Q.

Likewise when valve A2 is open, the upper opening 86 of the cylinder 52 is connected by the elements X, L, L2 and valve A2 and conduit W2 to the pipe W, and also to the coupling T1 and hence to pipes Z and Q. An additional conduit or passage V2 in the valve housing 80 is connected from passage V to the valve C and then through pipe N to the check valve F and thence through pipe P to the three-way valve E.

Pipe Z is connected by the T coupling T5 to the pipe Z1 which leads to opening 92 at the left-hand end of the reservoir 81. Coupling T5 is also connected to the pipe Y, the end of which may be provided with a suitable removable closure so that the reservoir 81 may be filled with oil. The reservoir 81 is also provided with a vent 94 through which excess oil or air may escape.

Pipe J connects opening 95 in reservoir 81 with opening 96 at the left-hand end 85 of the accumulator 82. The three-way valve is provided with the three positions I, II, III, indicated in the schematic elements at the right of valve E in Figure 3. Position I connects pipes Q and P and closes off the right-hand end of pipe R. Position II connects pipe R to pipe P and closes off the connection between pipe Q on the one hand and pipes R and P. Position III makes valve E the equivalent of a T coupling in which pipes Q, R and P are connected to each other.

Valve E may be turned to any of the three positions by operating its handle 100. Needle valve G may be adjusted to the proper opening to create the appropriate pressure differential on opposite sides thereof by rotation of handle 101. Valves A1 and A2 comprise a single body operated together. Valve B is a separate element worked, however, simultaneously with valves A1 and A2. The valve C is independently operable. When the valve element A1 is in the up position, it is closed, while when valve A2 is in the up position, it is open; also when valve A1 is in the down position it is open, and when valve A2 is in the down position, it is closed.

Consequently, whenever valve A1 is open, valve A2 is closed and vice versa.

Valve B is closed when it is in the up position and is open when it is in the down position. Since valves A1, A2 and B are moved up and down simultaneously, valves A1 and B either close or open together and valve A2 is open when valves A1 and B are closed and is closed when valves A1 and B are open.

The check valve D prevents flow from the accumulator 82 down to the opening 87 of cylinder 52 so that the hydraulic fluid may only flow in an upward direction through the pipe U from opening 87 to the coupling T3. Check valve F permits only a downward flow from pipes P to N, thereby permitting a flow from the reservoir 81 to the opening 87 at the lower end of cylinder 52 when valve C is open and valve E is in position I or III.

Figure 3:
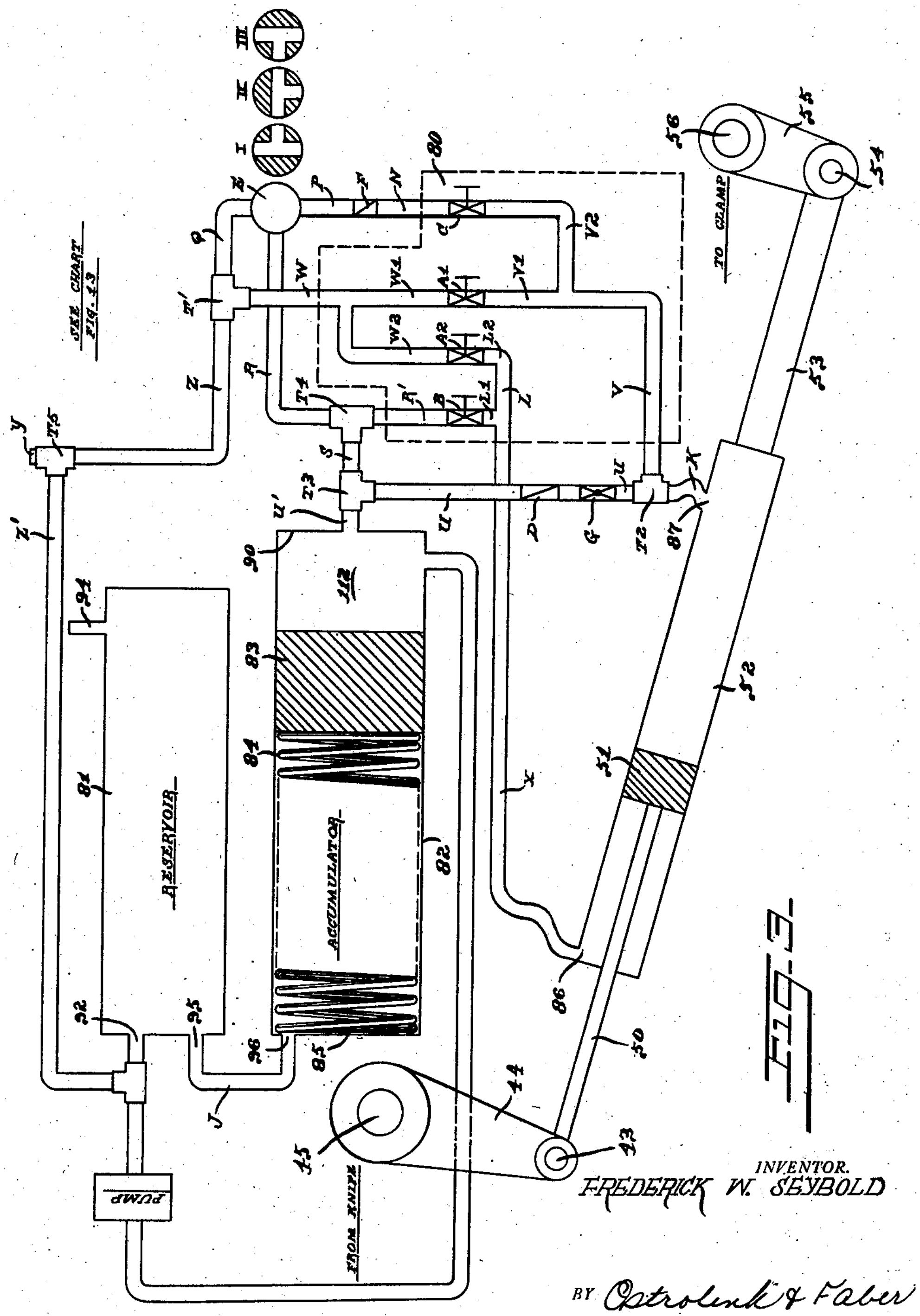
Figure 3 is a schematic representation of the hydraulic system of my invention.

A pump may, if desired, as shown in Figure 3 be provided between reservoir 81 and the pressure side 112 of accumulator 82 to the right of piston 83. This will permit the immediate establishment of pressure in chamber 112 after a shutdown of the machine without the necessity for operating the clamp up and down a few times to create the pressure.

I.—*Foot treadle operation to lower the clamp*

The operation of the foot treadle 110 and the operation of the actuating elements for controlling the valves A1, A2, B and C will be described after the operation of the valves themselves to control the flow of hydraulic fluid and the movement of the clamp are described.

As will be readily understood, the piston 83 under the pressure of compression spring 84 creates a predetermined degree of fluid pressure in section 112 of the accumulator between the piston 83 and the right-hand wall 90 thereof. When now the valves are operated according to the tabulation shown in Figure 13 so that valve A1 is closed, A2 is open, B is closed and C is open and the three-way valve is in position I of Figure 3, the clamp may be moved down by operation of the foot treadle 110 independently of the knife. This is so because the piston 51 may move freely with respect to the cylinder 52 or rather since piston 51 is held stationary by its connection to the lever 44 which in turn is stationary, the cylinder 52 may move down. This requires that fluid which is forced out through opening 86 of the cylinder on the downward movement to the right of the cylinder 52 be replaced at an equal rate with fluid entering the bottom opening 87 of the cylinder 52 so that an equilibrium of pressure is established on either side of piston 51 during the movement of member 55 in response to movement of the clamp. The clamp 66 descends, therefore, by gravity.

With valve B closed, the connection from the accumulator wherein the oil is under pressure through pipes L1, L and X to opening 86 at the upper or left-hand end of the cylinder 52 is closed and no oil under pressure may enter at that end. With three-way valve E in the position of Figure 1, accumulator pressure oil cannot pass through couplings T3 and T4 and pipe R to the bottom opening 87 of the cylinder. Check valve D prevents any flow down the pipe U from the accumulator 82 to the opening 87. The opening of valve C permits reservoir oil to flow through elements Z1—T5—Z—T1—Q-three-way valve E-elements P—F—N—C—V2—V and T2 through the hose K to the opening 87.

Thus, reservoir oil may enter the lower or right-hand end of cylinder 52 as the cylinder is pulled down by the weight of the clamp 66 to the right with the piston stationary. Since valve A2 is open, oil may flow readily out of opening 86 through elements X—L—L2—A2—W2—W to coupling T1 where the fluid from opening 86 mixes with the reservoir oil.

In other words, both openings 86 and 87 are connected to the reservoir 81 by opening valves A2 and C and closing valves A1 and B. Since, however, both connections to the reservoir 81 are through the coupling T1, a closed fluid circuit may be regarded as being established from opening 86 through elements X—L—L2—A2—W2—W—T1—Q—E—P—F—N—C—V2—V—T2 and K to opening 87.

Consequently, the pressure on opposite sides of the piston 51 is reservoir pressure or at the very least the pressure is equalized and cylinder 52 may slide readily with respect to the piston 51 even though the piston is held stationary.

The clamp may, therefore, be brought down by foot treadle.

II.—*Hydraulic lifting or return stroke of the clamp*

When it is desired thereafter to raise the clamp, the hydraulic pressure attained by the compression of spring 84 against piston 83 in the accumulator is utilized therefor.

For this purpose, valve A1 is open, valve A2 is closed, valve B is open and valve C is closed. To accomplish this result, valves A1, A2 and B are moved down and valve C is moved up. This power return stroke of the clamp by operating valves A1, A2 and B down and valve C up is used wherether or not the clamp has been brought down by foot treadle or by power. In other words, the return stroke of the clamp is always a power stroke. Thus, no manual or pedal strength is required to lift the weight of the clamp, and no return spring is required for the clamp.

In order to use fluid under pressure to lift the clamp after the cylinder 52 has been moved to the right with piston 51 stationary, it is necessary to move the cylinder 52 to the left while the piston 51 remains stationary. For this purpose, it becomes necessary to introduce fluid under pressure from the accumulator 82 into the opening 86 and as this fluid under pressure causes the left-hand end of the cylinder to move up and to the left, it is necessary simply to permit oil to drain through opening 87 from the right-hand lower end of cylinder 52.

The opening of valve A1 establishes a connection between the reservoir 81 and opening 87 at the right-hand lower end of cylinder 52 from reservoir 81, opening 92 and elements Z1—T5—Z—T1—W—W1—A1—V1—V—T2 and K. Consequently, as the cylinder 52 moves to the left with piston 51 stationary, oil may drain out of the bottom end of the cylinder. The closing of valve A2 cuts off the connection between opening 86 at the upper end of the cylinder and the reservoir 81. The opening of valve B permits oil under pressure to flow from the compression chamber 112 of the accumulator 82 to the opening 86 at the top of the cylinder over the path U1—T3—S—T4—R1—B—L1—L—X to opening 86. Valve C is closed and in the up position since it is not needed owing to the fact that it is in parallel with valve A1. The check valve D prevents a downward flow from the pressure chamber 112 of the accumulator 82 to the opening 87 of the lower portion of the cylinder 52.

The three-way valve E remains in position I; check valve F has no function since valve C is closed. Therefore, by moving the valves A1, A2, B and C to a position where valves A1, A2 and B are down and valve C is up (therefore opening valves A1 and B and closing valves A2 and C), oil under pressure is introduced through opening 86 to the upper portion of cylinder 52 to the left and oil bleeds out of the bottom of cylinder 52 through opening 87 to permit this movement to the left; arm 55 is rotated clockwise in the opposite direction from that in which it was operated to lower the clamp, and the clamp is now raised.

As previously pointed out, the mechanism is so arranged that valves A1, A2 and B are driven down and valve C pulled up at the completion of the power cutting strokes so that the clamp may automatically be raised, or valves A1, A2 and B may be moved down and valve C up at the will of the operator after he has moved the clamp down by foot treadle or other manual means in order to raise the clamp once more preliminary to a cutting stroke.

The clamp must be free to be moved down either by power or by foot treadle so that the operator may move the clamp down from time to time without going through a cutting stroke in order to use the edge of the clamp to determine that the stack of sheets to be cut is lined up properly.

III.—*Power operation of clamp during cutting stroke*

The clamp, of course, may also be driven down by a power operation in which case the operation is such that the pressure of the clamp on the sheets is a function of the resistance to oil flow through needle valve G, producing a clamping pressure. This additional pressure or power may be obtained after the clamp has been lowered so that the clamp may first be lowered by foot treadle and then instead of being raised, the power cutting operating stroke may be started in which case this power cutting operating stroke hydraulically controls the clamping pressure.

In order to use hydraulic power to bring the clamp down or to exert clamping pressure, valves A1, A2, B and C are operated so that A1, A2 and B are moved to the up position, thereby opening valve A2 and closing valves A1 and B, and valve C is moved down to open.

It will be obvious that when the clamp is being subjected to a power stroke, the piston 51 is being moved to the right. If the oil or fluid below the piston 51 cannot escape through opening 87, then the mechanical pressure of piston 51 on the oil will drive the right-hand end of cylinder 52 down and to the right thereby rotating arm 55 in a counterclockwise direction or in a direction to operate the clamp down.

If, in addition, hydraulic fluid under pressure is introduced through opening 87, then the mechanical pressure of piston 51 is augmented by the introduction of the fluid under pressure through opening 87 to drive the cylinder 52 to the right by a greater distance than would be possible solely by the mechanical operation of piston 51 to the right. At the same time, the fluid in the upper portion of cylinder 52 above the piston 51 must be able to exhaust through opening 86.

The closing of valve A1 shuts off the connection between the reservoir and opening 87 at the bottom end of the cylinder 52 closing off the path — reservoir — 92 — Z1 —T5 —Z—T1—W—W1—A1—V1—V—T2—K—87. The closing of valve B cuts off the connection between the accumulator and the opening 86 at the upper portion of the cylinder 52 by closing the path 112—U1—T3—S—T4—R1—B—L1—L—X—86.

Although valve C is open, back flow from opening 87 to the reservoir or the accumulator is prevented by check valve F. Valve A2 is open to connect the top of the cylinder by opening 86 to the reservoir 81 over the path 92—Z1—T5—Z—T1—W—W2—A2—L2—L—X—86. Oil may now exhaust from the upper end of the cylinder as required by movement of the cylinder 52 to the right.

The check valve D permits the upward flow from opening 87 to the accumulator 82 through the path 87—K—T2—U—G—D—U—T3—U1—112.

Three-way valve E is in the position I of Figure 3; the check valve F has no function since valves C and A1 are closed.

The needle valve G creates a pressure differential between the hose K and pipe U so that the pressure in the lower section of the cylinder 52 below the piston 51 may be higher than the accumulator pressure in the pressure chamber 112 of accumulator 82. This increased pressure is, of course, achieved by the movement of piston 51 downward and to the right.

The clamping pressure exerted on the clamp is, therefore, much higher than the actual pressure in the accumulator. In the case of a high stack of sheets where increased clamping pressure is desired, the clamp will stop at a higher point and the arm 55 will cease to rotate at an earlier position while the piston 51 will be pushed fully to the right at every knife stroke since the knife must go through the entire pile.

As the knife drives its way through the pile, the pressure of piston 51 against the now stationary or almost stationary lower end of cylinder 52 will increase the pressure in the lower end of cylinder 52, thereby increasing clamping pressure in proportion to the additional distance which the knife must go through over that which the clamp must travel through. Therefore, the higher the pile, the greater the clamping pressure achieved.

Check valve D permits the oil to flow upwardly after it has been forced through needle valve G into pipe U back to the accumulator compressing the spring 84, creating a clamping pressure in the cylinder below the piston which is higher than the accumulator pressure owing to the resistance to the flow created by the specific adjustment of needle valve G to the flow of oil in response to the pressure of the piston.

IV.—*Clamp driven down while the foot treadle is held down*

During the operation of my novel machine, occasions will frequently arise where the operator will desire to bring the clamp down first to the paper stack by means of the foot treadle in order to be sure that the line-up of the paper is accurate and true; and when he finds that the paper is in the right position, it is no longer necessary for him to bring the clamp up once more to perform the cutting stroke, but he may operate the necessary elements to perform the cutting stroke.

In this case, while the clamp is down it is necessary to increase the pressure on the clamp in accordance with the movement of the knife through the stack of paper and also in accordance with the degree of resistance encountered by the knife on its movement into the stack of paper.

For this operation, as shown in Figure 13, valves A1, A2 and B are in the up position and valve C is down. Therefore, valve A1 is closed, A2 is open, B is closed, C is open. The three-way valve E is in position I of Figure 3.

As was previously pointed out, the introduction of oil under pressure in the portion of cylinder 52 below the piston 51 or any other increase in pressure therein will drive the cylinder 52 to the right to rotate the arm 55 in the direction to increase the pressure on the clamp.

At the same time, means must be provided to permit oil to exhaust from the portion of the cylinder above the piston so that the cylinder may readily move to the right.

For this purpose, the closing of valve A1 cuts the connection between the reservoir and the bottom of the cylinder closing the path from reservoir 81—92—Z1—T5—Z—T1—W—W1—A1—V1—V—T2—K—87.

The opening of valve A2 opens an oil passage between the top of the cylinder and the reservoir from opening 86 over the path X—L—L2—A2—W2—W—T1—Z—T5—Z1—T2—reservoir 81.

The closing of valve B cuts off the connection between the accumulator 82 and the top of the cylinder over the path U1—T3—S—T4—R1—B—L1—L—X—86.

Valve C was in the open and down position owing to the fact that valves A1, A2, B and C are all in the position in which they were placed by operation of the foot treadle 110.

The opening of valve C permitted the reservoir oil, as was previously pointed out, to move from the reservoir down past the check valve F to the hose K and opening 87 in the bottom of the cylinder, thereby permitting the foot treadle to shift the clamp downwardly while, at the same time, moving the cylinder 52 to the right and down while the piston 51 remains stationary.

When, however, it is necessary to utilize oil under pressure in the portion of cylinder 52 below and to the right of piston 51, it is also necessary to prevent the bleeding off of this excess pressure to the reservoir.

For that reason, check valve F prevents an upward flow from opening 87 to valve C and pipe P. Since the piston 51 moves downwardly and to the right on the power operation of the knife and since the oil cannot escape from the portion of the cylinder below the piston while it may enter freely from the reservoir above the piston, the downward motion of the piston builds up pressure in the cylinder below the piston, driving the cylinder to the right and hence rotating arm 55.

By this means, therefore, clamping pressure is obtained, which pressure is a function of the adjustment of needle valve G.

V.—*Machine at rest with the clamp up*

In this case, as seen by the notations in the chart of Figure 13, valves A1, A2 and B are in the down position and valve C is in the up position.

Therefore, valves A1 and B are open and valves A2 and C are closed.

The accumulator pressure is thus available to the top of the cylinder through opening 86 over the path—accumulator 82—U1—T3—S—T4—R1—B—L1—X—86.

This drives the cylinder 52 up and to the left, rotating arm 55 to a position where the clamp is held up at its maximum point and the cylinder 52 is stationary at its maximum displacement to the left.

Reservoir pressure is available to the bottom of the cylinder through reservoir 81 over the path—92—Z1—T5—Z—T1—W—W1—A1—V1—V—T2—K—87. This pressure differential holds the clamp up.

It will be here noted that when the clamp is operated as in column 3 of Figure 13 for a regular power operation, the stroke of piston 51 to move the cylinder 52 to the right and, therefore, rotate arm 55 in the clamping direction is such as to drive the clamp down ahead of the knife so that the clamp engages the paper first.

During the return stroke as in column 2 of Figure 13, the stroke in the opposite direction is so arranged that the clamp will leave the paper only after the knife has left the paper pile.

VI.—*Clamp moved down by the foot treadle without a power stroke but additional hydraulic power required*

In this case, the foot treadle is operated just as in the first operation described for foot treadle operation to close valves A1 and B and open valves A2 and C. The piston 51 obviously remains stationary since the knife is not being operated.

In order to obtain the necessary hydraulic pressure to move the clamp down by a pressure greater than its own weight would ordinarily produce, it is necessary that fluid under pressure enter the portion of cylinder 52 below the piston 51 through opening 87.

Where the operator desires to work the machine so that the foot treadle operation will produce this increased preliminary pressure, the handle 100 of three-way valve E is adjusted from position I to position II of Figure 3. This closes the connection to the reservoir at the three-way valve E and connects the accumulator to opening 87 at the bottom of cylinder 52 over the following path: U1—T3—S—T4—R—position II of three-way valve E—P—F—N—C—V2—V—T2—K—87—52.

The opening of valve A2 leaves the opening 86 at the top of the cylinder 52 connected to the reservoir. Thus, the accumulator pressure drives the cylinder down to drive the clamp down.

The clamp may be returned once more to its upward position by releasing the foot treadle or by going through the power stroke which then operates by clamping pressure since check valve F prevents back flow through valve E to the accumulator and pressure is obtained by the resistance of needle valve G.

Three-way valve E has the additional position III which connects the accumulator to the reservoir for relieving the pressure in the accumulator.

This permits initial filling of the hydraulic system so that the entire system may be filled with fluid and permits the fluid to be drained off where required.

At the time the three-way valve E is opened to position III for this purpose, the filling opening Y should actually be closed with a sufficiently pressure-tight closure.

Accumulator pressure will then drain backwards over the path—U1—T3—S—R—position III of three-way valve E—Q—T1—Z—T5—Z1—92 into the reservoir.

If there happens to be more fluid in the system than the reservoir alone can handle, then the excess will exit through the vent 94.

The connection J between openings 95 in the reservoir and 96 in the accumulator permits reservoir oil to enter behind piston 83 of the accumulator as the spring 84 drives the piston 83 to the right, thereby avoiding any vacuum or low pressure which would prevent movement of piston 83 to the right; and when piston 83 is moved to the left during a down power stroke by pressure of fluid past needle valve G and check valve D toward the accumulator, the fluid to the left of piston 83 may bleed off freely back to the reservoir through pipe J, thereby avoiding any back pressure on piston 83.

A small leakage path around the piston 83 may be provided at the mid-position of the piston in the accumulator so that when the piston is pushed back close to its ultimate left-hand position, the front face of the piston will then uncover bleed ports to the path, thereby preventing the building up of a resistance in the accumulator higher than the resistance of valve G.

Figure 14:
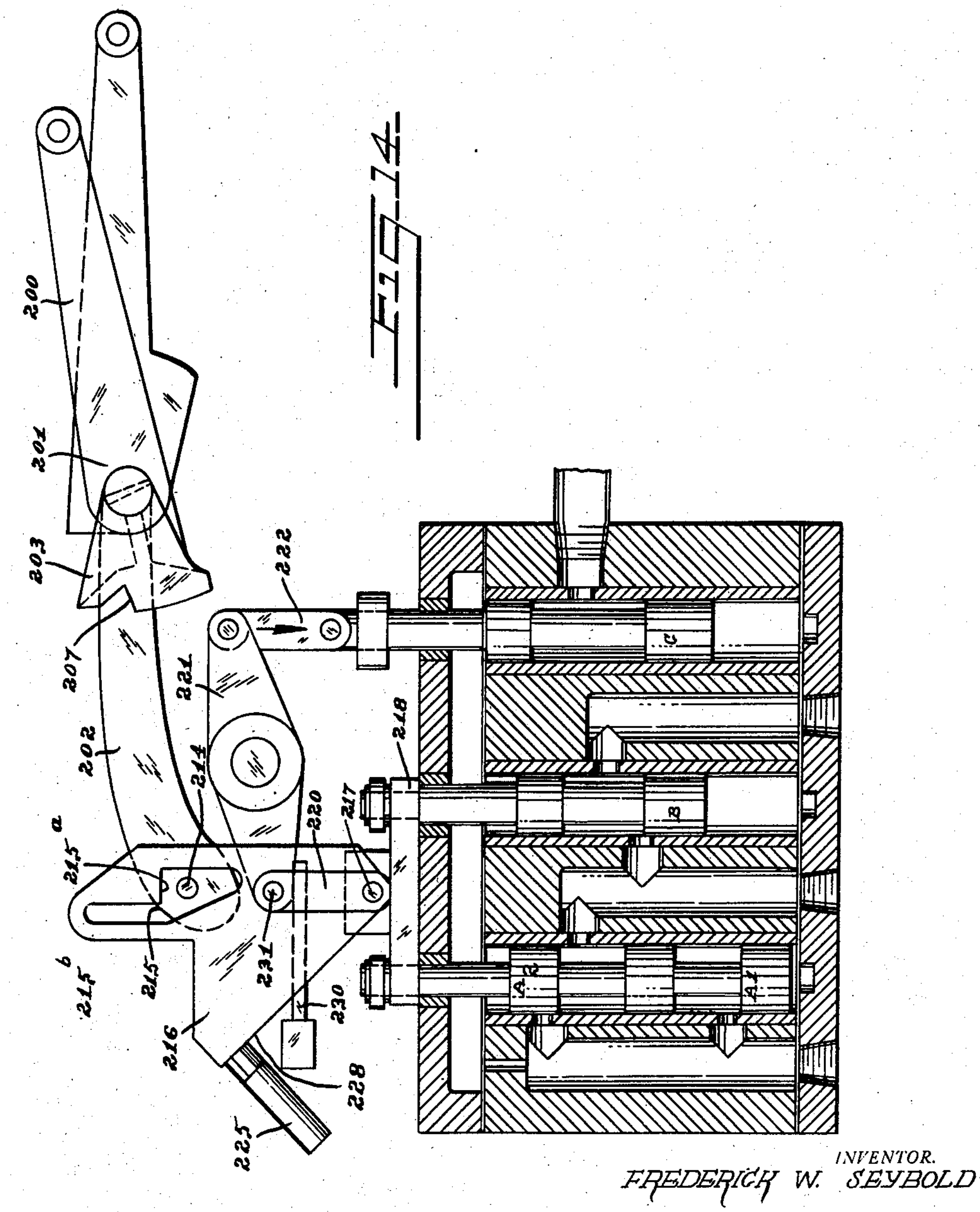
Figure 14 is an enlarged front view partly in transverse vertical section of a portion of Figure 2.

The handle 200 (Figures 1, 2 and 14) which operates the knife mechanism (and which may be connected thereto in the manner described in the above-mentioned application) also operates the clamping mechanism. Handle 200 is a lever pivotally mounted at 201 on the frame of the machine and having an extension 202 for operating valves A, B and C and an additional extension 203 for locking the same so that two-hand operation is necessary.

When handle 200 is pushed down, this motion is resisted by latch 204 engaging detent 207 in lever extension 203. Latch 204 is on the end of rod 205 slidable in sleeve 208 and biased toward engagement by spring 206, thereby normally preventing downward movement of handle 200. Bell crank lever 210 is pivotally mounted at 211 on the frame and is connected at 212 to the rod 205. When handle 213, carried by lever 210, is rotated clockwise, lever 210 rotates similarly to pull latch 204 out of detent 207, thereby permitting handle 200 to be moved down.

Since both handle 213 and handle 200 must be rotated simultaneously, the safety feature of two-hand operation is obtained.

Extension 202 of handle 200 has a pin 214 (Figure 14) extending in slot 215 of link 216 which in turn is pivoted at 217 to cross bar 218 which operates valves A and B. When handle 200 is pulled down, lifting pin 214, pin 214 lifts against ledge 215*a* of slot 215 in link 216 to lift link 216, cross bar 218 and valves A and B. Pivot 217 is connected by link 220 which is connected by lever 221 to link 222 connected to valve C. Consequently, when cross bar 218 is raised, lifting valves A and B, link 222 is pushed down, lowering valve C.

At the end of the cutting stroke, abutment 225, carried by lever 27, strikes ledge 228 of link 216, pushing it to the right where portion 215*b* of slot 215 registers with the pin 214, permitting link 216 to fall down and moving valves A and B down and valve C up.

Foot treadle 110 is essentially a bell crank lever, pivotally mounted at the front of the machine and having an inward extension 230 (Figures 1 and 14) bearing under pin 231 between link 220 and lever 221 to lift link 216 when the foot treadle 110 is pushed down.

In the foregoing I have described my invention in connection with a preferred embodiment thereof. Since many modifications and variations will now be obvious to those skilled in the art, I prefer to be bound not by the specific disclosures herein contained but only by the appended claims.

I claim:

1. In a reciprocating sheet cutting mechanism comprising a vertically reciprocating knife, driving members for the knife comprising a drive shaft, a first crank carried by said drive shaft, a pull bar connected between said first crank and one end of said knife, the invention which comprises a second crank carried by said drive shaft; a second shaft; a third crank carried by said second shaft; a link member connecting said second crank and said third crank; a fourth crank carried by said second shaft; said fourth crank being connected to the other end of the knife; rotation of said drive shaft through a cycle operating said first crank to pull down and push up the pull bar and the first-mentioned end of the knife and operating said fourth crank to pull down and push up the other end of the knife.

2. In a reciprocating sheet cutting mechanism comprising a vertically reciprocating knife, driving members for the knife comprising a drive shaft, a first crank carried by said drive shaft, a pull bar connected between said first crank and one end of said knife, the length of said pull bar being adjustable; the invention which comprises a second crank carried by said drive shaft; a second shaft; a third crank carried by said second shaft; a link member connecting said second crank and said third crank; a fourth crank carried by said second shaft; said fourth crank being connected to the other end of the knife; the point of connection of said fourth crank to said knife being adjustable vertically; rotation of said drive shaft through a cycle operating said first crank to pull down and push up the pull bar and the first-mentioned end of the knife and operating said fourth crank to pull down and push up the other end of the knife.

3. In a reciprocating sheet cutting mechanism comprising a vertically reciprocating knife, driving members for the knife comprising a drive shaft, a first crank carried by said drive shaft, a pull bar connected between said first crank and one end of said knife, the invention which comprises a second crank carried by said drive shaft; a second shaft; a third crank carried by said second shaft; a link member connecting said second crank and said third crank; a fourth crank carried by said second shaft; said fourth crank being connected to the other end of the knife; the connection of said fourth crank to said knife comprising registering openings in said members; a rotatable shaft through said openings; the portion of said shaft through the opening of one of said members being eccentric with respect to its center of rotation; rotation of said drive shaft through a cycle operating said first crank to pull down and push up the pull bar and the first-mentioned end of the knife and operating said fourth crank to pull down and push up the other end of the knife.

4. In a reciprocating sheet cutting mechanism comprising a vertically reciprocating knife, driving members for the knife comprising a drive shaft, a first crank carried by said drive shaft, a pull bar connected between said first crank and one end of said knife, the invention which comprises a second crank carried by said drive shaft; a second shaft; a third crank carried by said second shaft; a link member connecting said second crank and said third crank; a fourth crank carried by said second shaft; said fourth crank being connected to the other end of the knife; the connection of said fourth crank to said knife comprising registering openings in said members; a rotatable shaft through said openings; the portion of said shaft through the opening of one of said members being eccentric with respect to its center of rotation; and means for rotating said shaft to move the point of connection between said members; rotation of said drive shaft through a cycle operating said first crank to pull down and push up the pull bar and the first-mentioned end of the knife and operating said fourth crank to pull down and push up the other end of the knife.

5. In a reciprocating sheet cutting mechanism comprising a vertically reciprocating knife, driving members for the knife comprising a drive shaft, a first crank carried by said drive shaft, a pull bar connected between said first crank and one end of said knife, the invention which comprises a second crank carried by said drive shaft;

a second shaft; a third crank carried by said shaft; a link member connecting said second crank and said third crank; a fourth crank carried by said second shaft; said fourth crank being connected to the other end of the knife; the connection of said fourth crank to said knife comprising registering openings in said members; a rotatable shaft through said openings; the portion of said shaft through the opening of one of said members being eccentric with respect to its center of rotation; a gear on said shaft and a worm carried by one of said members connected to the gear for rotating said shaft to move the point of connection between said members.

FREDERICK W. SEYBOLD.

References Cited in the file of this patent

UNITED STATES PATENTS

| Number | Name | Date |
|---|---|---|
| 84,313 | Stiles | Nov. 24, 1868 |
| 732,754 | Lee | July 7, 1903 |
| 1,009,028 | Brown | Nov. 14, 1911 |
| 1,264,716 | Wadhams | Apr. 30, 1918 |
| 1,563,761 | Lowden | Dec. 1, 1925 |

FOREIGN PATENTS

| Number | Country | Date |
|---|---|---|
| 651,608 | Germany | Oct. 16, 1937 |